United States Patent [19]

Gugenhan

[11] Patent Number: 4,579,251

[45] Date of Patent: Apr. 1, 1986

[54] SEPARATOR FOR PNEUMATIC SINGLE GRAIN SOWING MACHINES

[76] Inventor: Heinrich Gugenhan, Schulstrasse 51, 5160 Düren, Fed. Rep. of Germany

[21] Appl. No.: 541,431

[22] Filed: Oct. 12, 1983

[30] Foreign Application Priority Data

Oct. 16, 1982 [DE] Fed. Rep. of Germany ....... 3238435

[51] Int. Cl.$^4$ ............................................. B65H 3/08
[52] U.S. Cl. .................................... 221/211; 221/160
[58] Field of Search ............. 221/160, 211, 254, 159, 221/158; 111/1, 34, 77

[56] References Cited

U.S. PATENT DOCUMENTS 3,990,606 11/1976 Gugenhan ........................... 221/211

FOREIGN PATENT DOCUMENTS 2249521 10/1973 France .
2333430 12/1975 France .
2359571 7/1976 France .
2394975 6/1977 France .

Primary Examiner—Stanley H. Tollberg
Attorney, Agent, or Firm—Staas & Halsey

[57] ABSTRACT

In a separator for pneumatic single grade sowing machines, a supporting plate (1) is provided to which a plurality of fingers (8; 28; 41) are pivotally connected. One end of the fingers forms an effective area section (12) which engages passing seed grains clinging to suction holes (6) of an apertured plate 4. Each finger (8; 28; 41) is engaged by a respective spring (13; 20; 23; 30; 44) which acts on the fingers (8; 28; 41) and thus on their effective area sections (12) against the direction of rotation (10) of the apertured plate (4) (FIG. 1).

12 Claims, 6 Drawing Figures

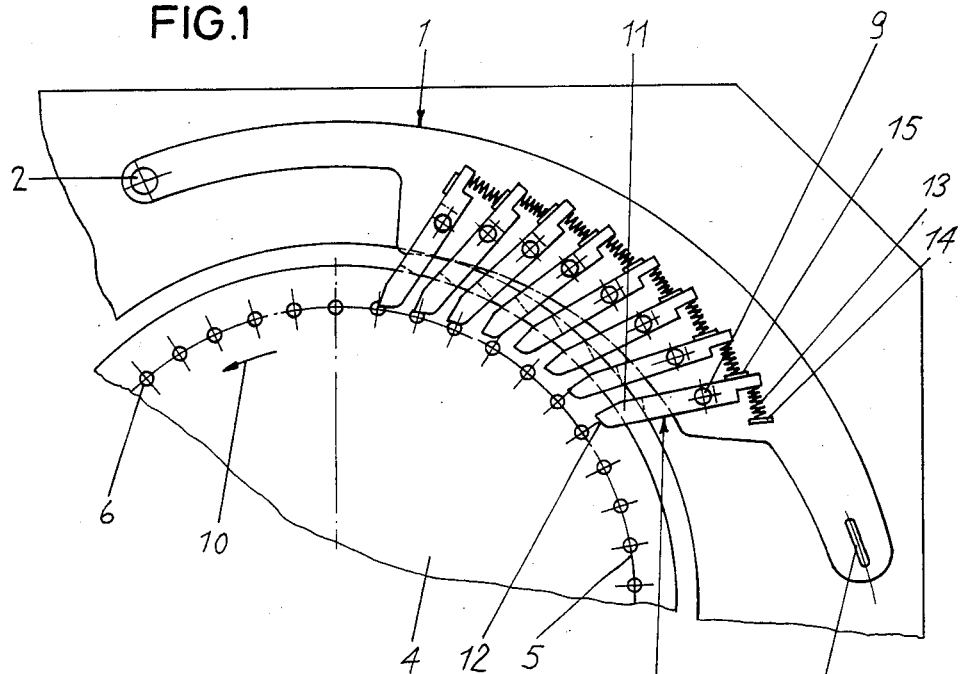
FIG.1
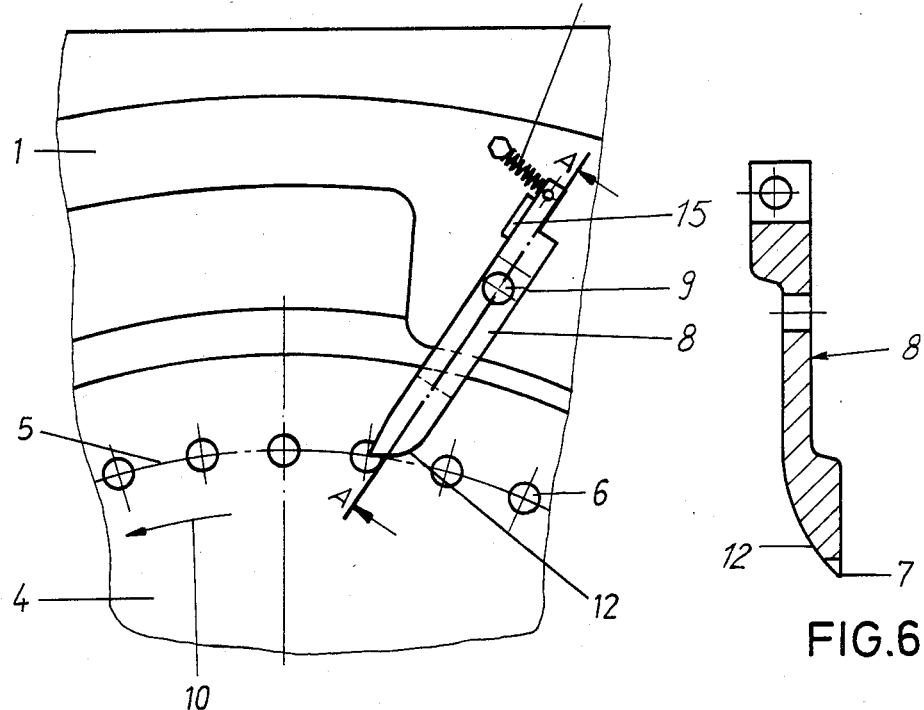
FIG.2
FIG.6

SEPARATOR FOR PNEUMATIC SINGLE GRAIN SOWING MACHINES

The invention relates to a separator for pneumatic single grain sowing machines, comprising an apertured plate which is rotatable about a substantially horizontal axis, has suction holes disposed on a circle, is subjected to vacuum on one side, and has the lower zone of its other side guided through a seed supply from which it takes along seed grains held at its holes during rotation, the separator being adjustable, extending parallel to the plate, projecting into the path of the holes from radially beyond to an increasing extent in the direction of rotation and possessing on the effective side facing the circle of holes a plurality of successive effective area sections which engage the seed grains successively.

It has long been known that in pneumatic single grain sowing machines comprising an apertured plate in the form of a disc movable between two chambers or a cover disc rotatable on a drum, it is possible for a plurality of seed grains to be carried out of the seed supply by each suction hole of the plate. For that reason, such single grain sowing machines have been equipped with a series of separators to ensure that only one seed grain is fed to the discharge point per suction hole.

In a known separator (DE-AS No. 27 01 982), its effective side remote from the apertured plate is a uniform effective area extending over the entire effective zone of the separator formed by continuously adjoining area sections of different materials having different coefficients of friction. The degree of friction between the seed grain and effective area of the separator is varied over the effective zone of the separator in that sections having a lower coefficient of friction alternate with sections having a higher coefficient of friction. This leads to movement of the grain accumulations in front of a suction hole and thus to a good separating effect. Further, it can however be observed in the case of this known separator that grains caught or jammed in a suction hole are sheared off or otherwise damaged by the separator.

The invention is based on the problem of constructing a separator of the aforementioned kind such that, whilst being efficient in depositing single grains, it will also have a gentle effect on any seed grains that are caught in a suction hole.

This problem is solved by the invention in a separator of the aforementioned kind in that the separator is formed by a supporting plate and independently movable fingers resiliently supported thereon and that each effective area section is formed by an end section of a finger, the fingers being engaged by springs which move the effective area sections from radially outwardly of the circle of holes into the path of movement of the seed grains clining to the holes.

Accordingly, the uniform effective area provided in the aforementioned state of the art is divided into a plurality of circumferentially successive effective area sections which, in the rotary direction of the apertured plate, project into the path of movement of the seed grains clinging to the suction holes from radially outwardly thereof to a progressively increasing extent. The individual effective area sections are not, however, rigid parts of the entire separator but rather parts of fingers which are independently movable relatively to the supporting plate. The effective area sections can therefore be deflected against a spring to avoid seed grains caught at the suction holes, thereby avoiding shearing off of such seed grains. This is of particular importance in the case of barley or other pointed seed grains of which the points may be jammed in the suction holes. If the separator cannot avoid such grains, the latter are severed and thereby probably lose their ability to germinate. The force exerted by the associated effective area section is selectable by the nature, property and arrangement of the springs.

The separator according to the invention may be constructed so that the fingers are pivoted to the supporting plate and pivotable with respect thereto independently of the other fingers about an axis substantially parallel to the axis of the apertured plate against the action of a spring and following the direction of rotation of the apertured plate. The fingers thereby execute a pivotal motion in which, depending on the direction of rotation of the apertured plate, they are carried along in the same sense and can therefore follow seed grains caught in a suction hole, without shearing them off.

The separator according to the invention may be constructed so that each finger co-operates with an abutment which is provided on the supporting plate and which defines the starting position of this finger against the action of the associated spring.

Co-operation of each separator with one abutment and one spring gives a defined starting position facilitating setting of the entire separator relatively to the circle of holes depending on the seeds concerned.

The separator according to the invention may be constructed so that each finger is in the form of a two-armed lever having its pivotal axis disposed between the one terminal section forming the effective area section and the point of engagement of the spring.

The separator according to the invention can be constructed so that each finger is in the form of a single-armed lever in which the one terminal section forming the effective arm section as well as the point of engagement of the spring are disposed on the same side of the pivotal axis of the finger.

The separator according to the invention can be constructed so that the fingers are mounted on the supporting plate for rectilinear movement and positioned in the starting position by an abutment. In this case, the individual fingers execute pure translatory movements.

The separator according to the invention can be constructed so that the fingers are so guided that their effective area sections are partly opposite to the direction of rotation of the apertured plate. This means that the circumferential component of the force holding the seed grains to the suction holes will assist in displacing the fingers.

The separator according to the invention can be constructed so that the springs of the individual fingers are in the form of helical springs.

The separator according to the invention can be constructed so that the springs of the individual fingers are in the form of leaf springs.

Other springs may also be considered which are suitable to return a lever to its starting position after deflection.

The separator according to the invention can be constructed so that the effective area sections of the individual fingers are inclined towards the circles of holes and the apertured plate. This construction assists engagement of the seed grains from below and thereby reduces the stress on the effective area sections and on the seed grains.

The separator according to the invention can be constructed so that each effective area section arcuately approaches the circle of holes as viewed in the direction of rotation of the apertured plate. In this way one avoids impulse-like stressing of the individual seed grains clinging to the suction holes from causing excessively severe engagement that might lead to all the grains clining to one suction hole being flung off. In all the embodiments, each finger is preferably provided with one effective area section but could have several.

Further, the separator according to the invention can be constructed so that all the fingers are congruent. This makes it possible to produce the fingers in a rational manner. The desired positioning of the effective area sections of the individual fingers relatively to the circle of holes can then be simply undertaken by suitably positioning the rotary axes and/or abutments of the fingers on the supporting plate.

A few embodiments of the separator according to the invention will now be described with reference to the drawings, wherein:

FIG. 1 is a plan view of a first embodiment of separator according to the invention with part of an apertured plate, the springs being in the form of helical springs and acting as compression springs;

FIG. 2 is an embodiment similar to FIG. 1 in which the springs are in the form of helical springs acting as tension springs (only one finger is shown);

FIG. 6 is a section on the line A—A in FIG. 2.

Figure 3:
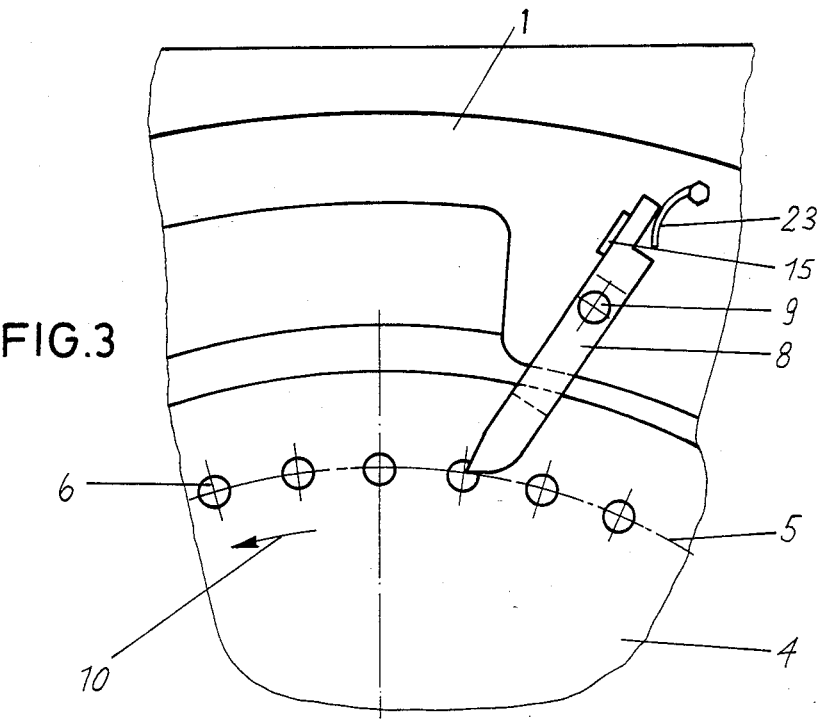
FIG. 3 is an embodiment similar to FIGS. 1 and 2 in which the springs are in the form of leaf springs (only one finger is shown)

The separator according to the invention comprises a supporting plate 1 having near one end a round hole 2 about the axis of which the separator is pivotable in a housing (not shown). At its opposite end, the supporting plate 1 contains a guide recess 3 in which a clamping screw (not shown) engages to define the pivotal position of the separator.

The separator co-operates with an apertured plate 4 which is not the subject of the present invention. This apertured plate 4 comprises a plurality of suction holes 6 disposed on a circle 5 and each smaller than the dimensions of the seed grains to be sown. The apertured plate 4 is rotatable about its centre point.

In the FIG. 1 embodiment, eight fingers 8 are connected to the supporting plate 1. The connection between the fingers 8 and supporting plate 1 is by pivot pins 9 which extend substantially parallel to one another and to the rotary axis of the apertured plate 4 and form pivotal axes for the fingers 8.

In the FIG. 1 embodiment, all the fingers 8 are identical. Nevertheless, as viewed in the direction 10 of rotation of the apertured plate 4, the end sections of the fingers 8 project progressively more into the path of movement of seed grains clinging to the apertured plate 4. This is achieved by appropriately positioning the pivot pins 9 for the individual fingers 8 on the supporting plate 1.

At its end section 11, each finger 8 comprises an effective area section 12 which is arcuate so that this effective area section will approach the circle 5 of holes in the direction 10 of rotation. In addition, each finger 8 is bevelled to the edge at its effective area section 12 (FIG. 6), to facilitate engagement from below the seed grains clinging to the suction holes 6. The outer edge 7 of the effective area sections 12 lies directly against the apertured plate 4.

In the FIG. 1 embodiment, a helical spring 13 in the form of a compression spring engages the radially outer end of each finger 8, the other end of the spring being supported by an abutment 14 fixed to the supporting plate 1. In the illustrated embodiment, the helical spring 13 biasses the finger 8 to turn anti-clockwise. Such rotation is opposed by an abutment 15 which, in turn, supports a helical spring for the adjacent finger. Accordingly, the helical spring 13 also presses the finger 8 against the abutment 15 so that in this way one obtains a defined starting position for the effective area section 12 of this finger 8.

If, now, a seed grain jammed in a suction hole 6 is moved in the direction 10 past the effective area section 12 of a finger 8, the finger 8 can follow this seed grain and move aside by pivoting about its pivot pin 9 and the pivotal axis formed thereby to an appropriate extent. This compresses the helical spring 13. As soon as the effective area section 12 is released again, the finger 8 is returned to the starting position defined by its abutment 15. From the description of the arrangement and function of the one finger 8, the construction and function of the other fingers will also become evident. What is important is that the movements of the individual fingers are not coupled to each other. The number of the fingers can be adapted to particular requirements.

The entire separator can, for the purpose of adapting to different seeds, be pivoted about the axis of the round hole 2 and set in position.

The FIG. 2 embodiment, of which only one finger is illustrated as in all the following embodiments even though the separator always comprises a plurality of such fingers, differs from the FIG. 1 embodiment only in that the springs are in the form of helical springs 20 acting as tension springs. These springs 20 pull one end of a finger 8 against an abutment 15 to define a starting position for the effective area section 12 of this finger.

The embodiment of FIG. 3 differs from the previously described embodiments only in that the outer end of finger 8 is engaged by a leaf spring 23 which resiliently presses the finger 8 against an abutment 15 in the counter-clockwise direction.

Figure 4:
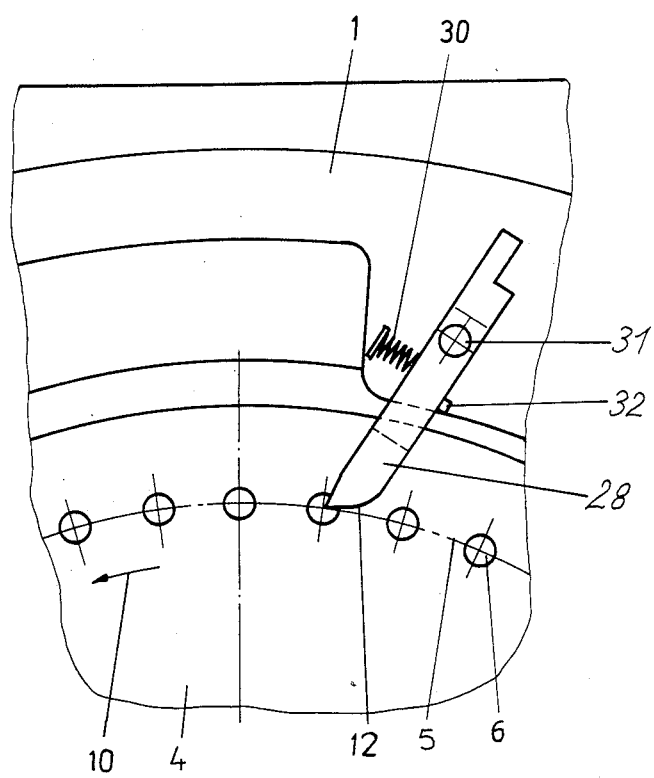
FIG. 4 is a fragmentary view of a second embodiment with a finger in the form of a one-armed lever (only one finger is shown)

In the FIGS. 1 to 3 embodiments, the pivot pin is always disposed between the effective area section and the point of engagement of the spring. FIG. 4 makes it clear that the fingers could also be in the form of one-armed levers 28 in which the effective area section 12 and the point of engagement of a spring 30 lie on one and the same side of a pivot shaft 31. In this embodiment there is likewise an abutment 32 which limits movement of the fingers in the counter-clockwise sense and thereby defines a starting position. When the finger is in the form of a one-armed lever, the spring 30 can likewise have different constructions. In particular, helical springs are suitable which act as compression or tension springs and exert a force on the fingers that is directed towards the abutment 32. However, leaf springs or similar springs may be used.

Figure 5:
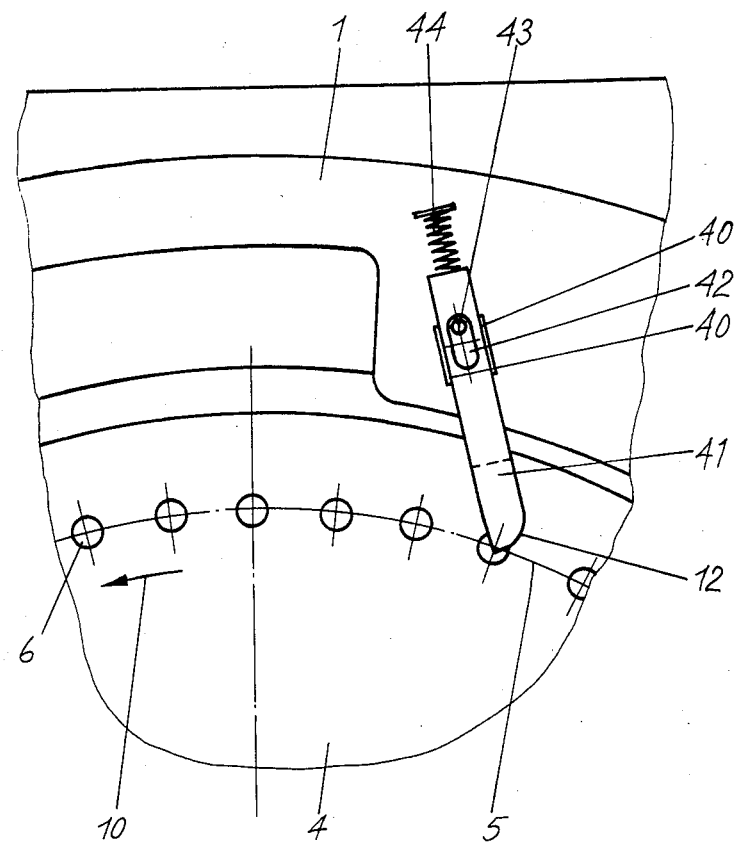
FIG. 5 is a fragmentary view of a further embodiment with rectilinearly guided fingers (only one finger is shown)

The FIG. 5 embodiment differs from that of the previously described embodiments in that the supporting plate 1 is provided with guides 40 in which a finger 41 is guided for rectilinear displacement. The finger 41 has an elongated hole 42 in which a pin 43 engages which is secured to the supporting plate 1 and forms an abutment for the maximum deflection of the finger 41 in a direction towards the circle 5 of holes. The radially outer end of finger 41 is engaged by a spring which, in the illustrated embodiment, is a helical spring 44 acting as a compression spring. At its other end, the finger 41 has an effective area section 12 which is arcuate and may be shaped as in FIG. 6.

The finger 41 is guided in a direction which is slightly opposite to the direction of rotation of the apertured plate 4.

If a seed grain caught in a suction hole 6 engages the effective area section 12 of this finger 41, the finger is deflected radially outwardly and permits this seed grain to pass without damaging same.

I claim:

1. A separator for pneumatic single-grain sowing machines, comprising an apertured plate which is rotatable about a substantially horizontal axis, has suction holes disposed on a circle, is subjected to vacuum on one side, and has the lower zone of its other side guided through a seed supply from which it takes along seed grains held at its holes during rotation, the separator being adjustable, extending parallel to the plate, projecting into the path of the holes from radially beyond to an increasing extent in the direction of rotation and possessing in the effective side facing the circle of holes a plurality of successive effective area sections which engage the seed grains successively, characterised in that the separator is formed by a supporting plate (1) and independently movable fingers (8; 28; 41) resiliently supported thereon and that each effective area section (12) is formed by an end section of a finger (8; 28; 41), the fingers being engaged by springs (13; 20; 23; 30; 44) which move the effective area sections (12) from radially outwardly of the circle (5) of holes into the path of movement of the seed grains clinging to the holes (6).

2. A separator according to claim 1, characterised in that the fingers (8; 28) are pivoted to the supporting plate (1) and are pivotable with respect thereto independently of the other fingers 8; 28, about an axis substantially parallel to the axis of the apertured plate (4) against the action of a spring (13; 20; 23; 30) to follow the direction (10) of the apertured plate (4).

3. A separator according to claim 1 or claim 2, characterised in that each finger (8; 28) co-operate with an abutment (15; 32) which is provided on the supporting plate (1) and defines the starting position of this finger against the action of the associated spring (13; 20; 23; 30).

4. A separator according to claim 1 or claim 2, characterised in that each finger (8) is in the form of a two-armed lever of which the pivotal axis (9) is disposed between an end section forming the effective area section (12) and the point of engagement of the spring (13; 20; 23).

5. A separator according to claim 1 or claim 2, characterised in that each finger (28) is in the form of a one-armed lever in which the one end section forming the effective area section (12) as well as the point of engagement of the spring (30) are disposed on the same side of the pivotal axis (31) of the finger (28).

6. A separator according to claim 1, characterised in that the fingers (41) are rectilinearly guided on the supporting plate (1) and have their starting position defined by an abutment (43).

7. A separator according to claim 6, characterised in that the fingers (41) are so guided that their effective area sections (12) are partially opposed to the direction (10) of rotation of the apertured plate (4).

8. A separator according to claim, 1, 2, 6 or 7 characterised in that the springs (13; 20; 30; 44) of the individual fingers are in the form of helical springs.

9. A separator according to claim 1, 2, 6 or 7 characterised in that the springs (23) of the individual fingers are in the form of leaf springs.

10. A separator according to claim 1, 2, 6 or 7, characterised in that the effective area sections (12) of the individual fingers (8; 28; 41) are inclined towards the circle (5) of holes and to the apertured plate (4).

11. A separator according to claim 1, 2, 6 or 7, characterised in that each effective area section (12) arcuately approaches the circle (5) of holes as viewed in the direction (10) of rotation of the apertured plate (4).

12. A separator according to claim 1, 2, 6 or 7, characterised in that all the fingers (8; 28; 41) are congruent.

* * * * *